(12) United States Patent
Toyomura et al.

(10) Patent No.: US 11,846,536 B2
(45) Date of Patent: Dec. 19, 2023

(54) SENSOR TARGET COVER USED IN COMBINATION WITH LIQUID LEVEL DETECTION SENSOR, WET PROCESSING DEVICE, SUBSTRATE PROCESSING DEVICE, AND SENSOR ASSEMBLY

(71) Applicant: EBARA CORPORATION, Tokyo (JP)

(72) Inventors: Naoki Toyomura, Tokyo (JP); Mitsuru Miyazaki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 1170 days.

(21) Appl. No.: 16/532,493

(22) Filed: Aug. 6, 2019

(65) Prior Publication Data
US 2020/0049546 A1 Feb. 13, 2020

(30) Foreign Application Priority Data

Aug. 7, 2018 (JP) ................. 2018-148638

(51) Int. Cl.
| | |
|---|---|
| G01F 23/292 | (2006.01) |
| B24B 37/34 | (2012.01) |
| B08B 3/02 | (2006.01) |
| B08B 3/04 | (2006.01) |
| B24B 37/005 | (2012.01) |

(52) U.S. Cl.
CPC ............ *G01F 23/2921* (2013.01); *B08B 3/02* (2013.01); *B08B 3/04* (2013.01); *B24B 37/005* (2013.01); *B24B 37/34* (2013.01)

(58) Field of Classification Search
CPC ......... G01F 23/2921; B08B 3/02; B08B 3/04; B24B 37/005; B24B 37/34
See application file for complete search history.

(56) References Cited

U.S. PATENT DOCUMENTS

| | | | | |
|---|---|---|---|---|
| 4,946,242 A | * | 8/1990 | Tanno ................. | G02B 6/4212 356/28 |
| 5,804,831 A | * | 9/1998 | Romatzick ......... | G01F 23/2925 250/577 |
| 6,831,290 B2 | * | 12/2004 | Mentzer ............... | G01F 23/292 250/227.25 |
| 8,994,812 B2 | * | 3/2015 | Giordano ............. | G01F 23/292 348/81 |
| 2015/0357213 A1 | * | 12/2015 | Yokoyama ........ | H01L 21/68707 134/32 |
| 2017/0066101 A1 | * | 3/2017 | Yamaguchi ....... | H01L 21/67046 |
| 2018/0093904 A1 | * | 4/2018 | Collins .................. | C02F 1/325 |

FOREIGN PATENT DOCUMENTS

| | | | |
|---|---|---|---|
| JP | H0669177 | | 3/1994 |
| JP | 2004163310 A | * | 6/2004 |
| JP | 2015230940 | | 12/2015 |
| KR | 20010038698 | | 5/2001 |
| KR | 20170070888 | | 6/2017 |

* cited by examiner

*Primary Examiner* — Alesa Allgood
*Assistant Examiner* — Dilara Sultana
(74) *Attorney, Agent, or Firm* — JCIPRNET (57) ABSTRACT

A sensor target cover capable of preventing an optical liquid level detection sensor from erroneously detecting a rise in a liquid level is provided. A sensor target cover is used in combination with an optical liquid level detection sensor. The sensor target cover includes a reflecting plate, an inner wall structure surrounding the reflecting plate, and an outer wall structure surrounding the inner wall structure. A gap is formed between the inner wall structure and the outer wall structure.

10 Claims, 9 Drawing Sheets

SENSOR TARGET COVER USED IN COMBINATION WITH LIQUID LEVEL DETECTION SENSOR, WET PROCESSING DEVICE, SUBSTRATE PROCESSING DEVICE, AND SENSOR ASSEMBLY

CROSS-REFERENCE TO RELATED APPLICATION

This application claims the priority benefits of Japan Patent Application No. 2018-148638, filed on Aug. 7, 2018. The entirety of the above-mentioned patent application is hereby incorporated by reference herein and made a part of this specification.

BACKGROUND

Technical Field

The disclosure relates to a sensor target cover used in combination with a liquid level detection sensor of a wet processing device such as a substrate cleaning device or a buff polishing device. In addition, the disclosure relates to a wet processing device including the sensor target cover and an optical liquid level detection sensor.

Description of Related Art

In chemical mechanical polishing (CMP) devices, substrates such as wafers are polished and then cleaned. A CMP device generally includes a CMP unit that chemically and mechanically polishes a substrate and a cleaning unit for cleaning the polished substrate. The cleaning unit cleans a front surface and a rear surface of the substrate by bringing a cleaning tool such as a roll sponge or a pen sponge into sliding contact with the substrate while supplying a liquid such as a chemical liquid or a rinse liquid to the substrate.

Such a cleaning unit is provided with a drain port for discharging a liquid. A liquid used to clean the substrate is discharged through the drain port. However, when the drain port is clogged with refuse such as fragments of the substrate, the liquid is not discharged from the cleaning unit and is collected in the cleaning unit. As a result, a cleaning tool disposed inside the cleaning unit or a motor for rotating the cleaning tool is immersed in the liquid.

Consequently, the cleaning unit includes an optical liquid level detection sensor that detects a liquid level inside the cleaning unit. The optical liquid level detection sensor is configured to emit light toward a reflecting plate disposed inside the cleaning unit and to measure the amount of light reflected from the reflecting plate. When a liquid level does not rise, the optical liquid level detection sensor can receive the reflected light from the reflecting plate. However, when a liquid level rises and the reflecting plate sinks in a liquid, the optical liquid level detection sensor cannot receive the reflected light from the reflecting plate because air and a liquid have different refractive indices. As a result, the amount of light measured by the optical liquid level detection sensor is reduced. A measured value of the amount of light is compared with a threshold value by a signal processing part. When the measured value of the amount of light is smaller than the threshold value, the signal processing part detects a rise in the liquid level inside the cleaning unit.

However, in a case where a liquid adheres to a reflecting plate or condensation occurs in the reflecting plate when a liquid level does not rise, the way the light is reflected changes, and the amount of light measured by an optical liquid level detection sensor may be reduced. As a result, a signal processing part may not be able to correctly detect a rise in a liquid level.

Consequently, the disclosure provides a sensor target cover capable of preventing an optical liquid level detection sensor from erroneously detecting a rise in a liquid level. In addition, the disclosure provides a wet processing device including the sensor target cover and the optical liquid level detection sensor.

SUMMARY

In an aspect, there is provided a sensor target cover used in combination with an optical liquid level detection sensor, the sensor target cover including a reflecting plate, an inner wall structure surrounding the reflecting plate, and an outer wall structure surrounding the inner wall structure, in which a gap is formed between the inner wall structure and the outer wall structure.

In the aspect, there is provided a wet processing device including a processing tank, a substrate holding part disposed inside the processing tank, a drain port disposed at the processing tank, a liquid supply nozzle disposed inside the processing tank, an optical liquid level detection sensor detecting a liquid level inside the processing tank, and a sensor target cover facing the optical liquid level detection sensor.

In the aspect, there is provided a substrate processing device including a polishing part polishing a substrate, a cleaning part including a plurality of wet processing devices that clean the polished substrate, and a transport device transporting the polished substrate from the polishing part to the cleaning part.

In the aspect, there is provided a sensor assembly for use in wet processing device including an optical liquid level detection sensor and a sensor target cover facing the optical liquid level detection sensor, wherein the sensor target cover includes a reflecting plate, an inner wall structure surrounding the reflecting plate, and an outer wall structure surrounding the inner wall structure, and a gap is formed between the inner wall structure and the outer wall structure.

DESCRIPTION OF THE EMBODIMENTS

In an aspect, a lower end of the outer wall structure is positioned higher than a lower end of the inner wall structure, and an upper end of the outer wall structure is positioned higher than an upper end of the inner wall structure. In the aspect, an inner space of the inner wall structure is partitioned into a first room and a second room by the reflecting plate. In the aspect, the inner wall structure includes an inner protection wall facing the reflecting plate and two inner walls disposed on both sides of the reflecting plate and the inner protection wall. In the aspect, the outer wall structure includes two outer walls disposed on the outer sides of the two inner walls, an outer protection wall disposed on the outer side of the inner protection wall, and a ceiling wall. In the aspect, gaps are formed between outer surfaces of the two inner walls and inner surfaces of the two outer walls, a gap is formed between an outer surface of the inner protection wall and an inner surface of the outer protection wall, and a gap is formed between an upper end of each of the two inner walls and the inner protection wall and a lower surface of the ceiling wall.

In the aspect, a gap is formed between a lower end of the sensor target cover and a bottom of the processing tank. In the aspect, the wet processing device further includes an exhaust port disposed inside the processing tank. In the aspect, the wet processing device further includes a clean air supply device disposed at a position higher than a substrate inlet and a substrate outlet of the processing tank.

A reflecting plate is surrounded by an inner wall structure, and the inner wall structure is surrounded by an outer wall structure. Therefore, the inner wall structure and the outer wall structure can prevent a liquid from adhering to a reflecting plate. Further, since a gap is formed between the inner wall structure and the inner wall structure, a flow of air is formed in a sensor target cover. The flow of air can prevent condensation from occurring in the reflecting plate inside the sensor target cover. In general, the inside of a processing tank is in a hot and humid state due to the presence of a heat source such as a motor and a liquid used for processing the substrate. Since the above-described sensor target cover has high air permeability even under a hot and humid environment, it is possible to prevent condensation from occurring in the reflecting plate disposed inside the sensor target cover. Therefore, an optical liquid level detection sensor can accurately detect a liquid level inside the processing tank.

Figure 1:
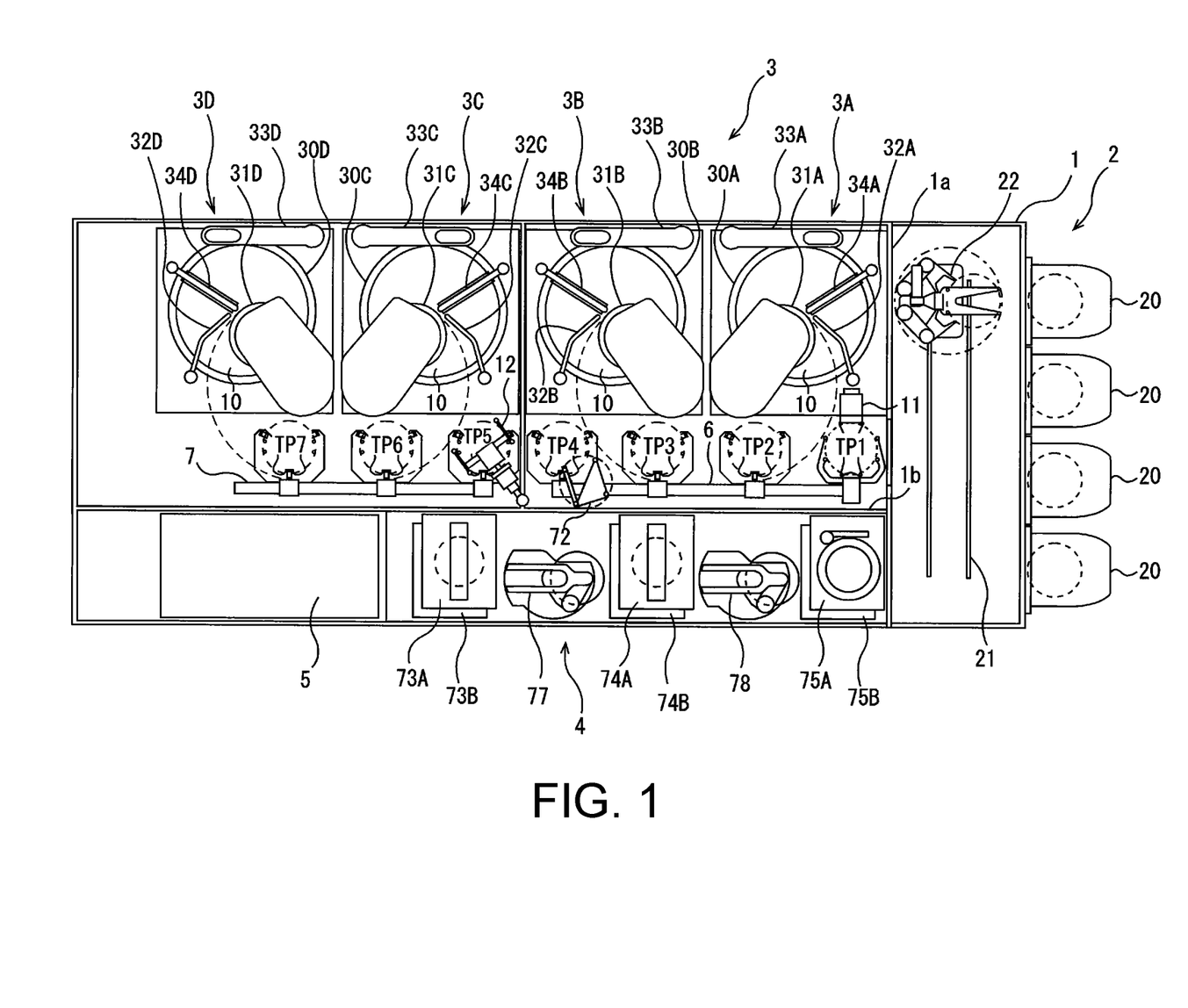
FIG. 1 is a schematic view of an embodiment of a substrate processing device for polishing a substrate such as a wafer, cleaning the polished substrate, and drying the cleaned substrate.

Hereinafter, an embodiment of the disclosure will be described with reference to the accompanying drawings. FIG. 1 is a schematic view of an embodiment of a substrate processing device for polishing a substrate such as a wafer, cleaning the polished substrate, and drying the cleaned substrate. As shown in FIG. 1, the substrate processing device includes a housing 1 having a substantially rectangular shape, and the inside of the housing 1 is divided into a loading/unloading part 2, a polishing part 3, and a cleaning part 4 by partitions 1a and 1b. The substrate processing device includes an operation control part 5 that controls a substrate processing operation.

The loading/unloading part 2 includes front loading parts 20 at which substrate cassettes each accommodating a large number of substrates (for example, wafers) are mounted. In the loading/unloading part 2, a rail mechanism 21 is laid along a row of the front loading parts 20, and a transport robot (loader) 22 that can move in an arrangement direction of the substrate cassettes is installed on the rail mechanism 21. The transport robot 22 moves on the rail mechanism 21 so that it can access the substrate cassettes loaded on the front loading parts 20. Further, the transport robot 22 is configured to be capable of being raised and lowered.

The polishing part 3 includes a plurality of polishing units capable of polishing a plurality of substrates in parallel. The polishing part 3 in the present embodiment includes a first polishing unit 3A, a second polishing unit 3B, a third polishing unit 3C, and a fourth polishing unit 3D. However, the number of polishing units is not limited to the present embodiment.

As shown in FIG. 1, the first polishing unit 3A includes a first polishing table 30A to which the polishing pad 10 having a polishing surface is attached, a first polishing head 31A for pressing the substrate against the polishing pad 10 on the polishing table 30A and polishing the substrate, a first liquid supply nozzle 32A for supplying a polishing liquid (for example, a slurry) or a dressing liquid (for example, pure water) to the polishing pad 10, a first dresser 33A for dressing the polishing surface of the polishing pad 10, and a first atomizer 34A that atomizes a mixed fluid of a liquid (for example, pure water) and a gas (for example, nitrogen gas) and sprays the atomized fluid to the polishing surface of the polishing pad 10.

Similarly, the second polishing unit 3B includes a second polishing table 30B to which the polishing pad 10 is attached, a second polishing head 31B, a second liquid supply nozzle 32B, a second dresser 33B, and a second atomizer 34B, the third polishing unit 3C includes a third polishing table 30C to which the polishing pad 10 is attached, a third polishing head 31C, a third liquid supply nozzle 32C, a third dresser 33C, and a third atomizer 34C, and the fourth polishing unit 3D includes a fourth polishing table 30D to which the polishing pad 10 is attached, a fourth polishing head 31D, a fourth liquid supply nozzle 32D, a fourth dresser 33D, and a fourth atomizer 34D.

The first polishing unit 3A, the second polishing unit 3B, the third polishing unit 3C, and the fourth polishing unit 3D have the same configuration. In the first polishing unit 3A, the polishing of the substrate is performed as follows. Each of the polishing head 31A and the polishing table 30A is rotated, and a polishing liquid (slurry) is supplied onto the polishing head 10 from the liquid supply nozzle 32A. In this state, the polishing head 31A presses the substrate against the polishing surface of the polishing pad 10. A front surface of the substrate is polished through a chemical operation of the polishing liquid and a mechanical operation of an abrasive included in the polishing liquid. After the polishing is terminated, dressing (conditioning) of the polishing surface is performed by the dresser 33A, and a high pressure fluid is supplied to the polishing surface from the atomizer 34A, whereby a polish residue and slurry remaining on the polishing surface are removed. The polishing of the substrate is similarly performed on the second polishing unit 3B, the third polishing unit 3C, and the fourth polishing unit 3D.

A first linear transporter 6 is disposed adjacent to the first polishing unit 3A and the second polishing unit 3B. The first linear transporter 6 is a transport device that transports the substrate between four transport positions (a first transport position TP1, a second transport position TP2, a third transport position TP3, and a fourth transport position TP4). In addition, a second linear transporter 7 is disposed adjacent to the third polishing unit 3C and the fourth polishing unit 3D. The second linear transporter 7 is a transport device that transports the substrate between three transport positions (a fifth transport position TP5, a sixth transport position TP6, and a seventh transport position TP7).

The substrate is transported to the first polishing unit 3A and/or the second polishing unit 3B by the first linear transporter 6. The polishing head 31A of the first polishing unit 3A moves between a position above the polishing table 30A and the second transport position TP2 through a swing operation thereof. Therefore, transfer of the substrate between the polishing head 31A and the first linear transporter 6 is performed at the second transport position TP2.

Similarly, the polishing head 31B of the second polishing unit 3B moves between a position above the polishing table 30B and the third transport position P3, and transfer of the substrate between the polishing head 31B and the first linear transporter 6 is performed at the third transport position TP3. The polishing head 31C of the third polishing unit 3C moves between a position above the polishing table 30C and the sixth transport position TP6, and transfer of the substrate between the polishing head 31C and the second linear transporter 7 is performed at the sixth transport position TP6. The polishing head 31D of the fourth polishing unit 3D moves between a position above the polishing table 30D and the seventh transport position TP7, and transfer of the substrate between the polishing head 31D and the second linear transporter 7 is performed at the seventh transport position TP7.

A lifter 11 for receiving the substrate from the transport robot 22 is disposed at the first transport position TP1. The lifter 11 is disposed between the transport robot 22 and the first linear transporter 6. The substrate is transferred to the first linear transporter 6 from the transport robot 22 through the lifter 11. A shutter (not shown) is provided at the partition 1a to be positioned between the lifter 11 and the transport robot 22, and the shutter is opened during the transport of the substrate so that the substrate is transferred from the transport robot 22 to the lifter 11.

A swing transporter 12 which is a transport device for transporting the substrate is disposed between the first linear transporter 6, the second linear transporter 7, and the cleaning part 4. The transport of the substrate from the first linear transporter 6 to the second linear transporter 7 is performed by the swing transporter 12. The substrate is transported to the third polishing unit 3C and/or the fourth polishing unit 3D by the second linear transporter 7.

A tentative placing stage 72 of the substrate which is installed at a frame not shown in the drawing is disposed at the side of the swing transporter 12. The tentative placing stage 72 is disposed adjacent to the first linear transporter 6 and is positioned between the first linear transporter 6 and the cleaning part 4. The swing transporter 12 transports the substrate between the fourth transport position TP4, the fifth transport position TP5, and the tentative placing stage 72.

The cleaning part 4 includes first cleaning units 73A and 73B and second cleaning units 74A and 74B that clean the polished substrate, and drying units 75A and 75B that dry the cleaned substrate. The first cleaning unit 73A is disposed above the first cleaning unit 73B, and the second cleaning unit 74A is disposed above the second cleaning unit 74B. The drying unit 75A is disposed above the drying unit 75B.

The cleaning part 4 further includes a first transport robot 77 and a second transport robot 78 as a transport device for transporting the substrate. The substrate mounted on the tentative placing stage 72 is carried into the cleaning part 4 by the first transport robot 77. The first transport robot 77 is disposed between the first cleaning units 73A and 73B and the second cleaning units 74A and 74B. The first transport robot 77 is operated to transport the substrate from the tentative placing stage 72 to the first cleaning unit 73A or the first cleaning unit 73B. The second transport robot 78 is disposed between the second cleaning units 74A and 74B and the drying units 75A and 75B.

Figure 2:
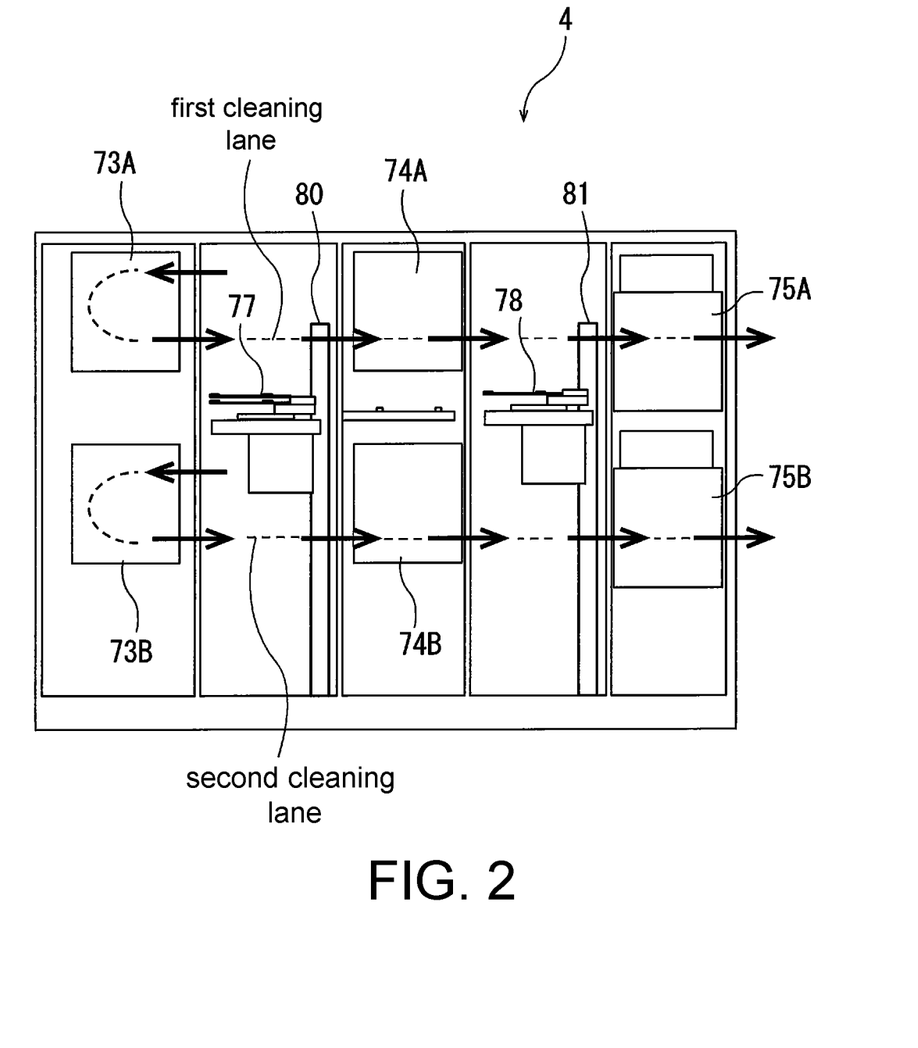
FIG. 2 is a side view of the cleaning part shown in FIG. 1.

FIG. 2 is a side view of the cleaning part 4. As shown in FIG. 2, the first cleaning unit 73A is disposed above the first cleaning unit 73B, and the second cleaning unit 74A is disposed above the second cleaning unit 74B. The drying unit 75A is disposed above the drying unit 75B. The first transport robot 77 is supported by the first lifting shaft 80 and is configured to be vertically movable on the first lifting shaft 80. The second transport robot 78 is supported by the second lifting shaft 81 and is configured to be vertically movable on the second lifting shaft 81.

The first transport robot 77 is operated to transport the substrate from the first cleaning unit 73A or the first cleaning unit 73B to the second cleaning unit 74A or the second cleaning unit 74B. The second transport robot 78 is operated to transport the substrate from the second cleaning unit 74A or the second cleaning unit 74B to the drying unit 75A or the drying unit 75B.

The cleaning part 4 includes two first cleaning units 73A and 73B, two second cleaning units 74A and 74B, and two drying units 75A and 75B, and thus it is possible to configure two cleaning lanes that clean and dry two substrates in parallel. "Cleaning lane" refers to a processing path through which one substrate is cleaned and dried by a plurality of cleaning units and drying units inside the cleaning part 4. For example, as shown in FIG. 2, one substrate can be transported in order of the first cleaning unit 73A, the second cleaning unit 74A, and the drying unit 75A (first cleaning lane), and in parallel with this, the other substrate can be transported in order of the first cleaning unit 73B, the second cleaning unit 74B, and the drying unit 75B (second cleaning lane). In this manner, the two parallel cleaning lanes can clean and dry the two substrates in parallel.

In the two parallel cleaning lanes, a plurality of substrates may be cleaned and dried with a predetermined time difference. Advantages of cleaning with a predetermined time difference are as follows. The first transport robot 77 and the second transport robot 78 are shared by a plurality of cleaning lanes. For this reason, in a case where a plurality of cleaning or drying processes are terminated at the same time, the transport robot cannot immediately transport the substrate, which results in deterioration of a throughput. In order to avoid such a problem, the processed substrate can be rapidly transported by the transport robots 77 and 78 by cleaning and drying the plurality of substrates with a predetermined time difference.

In the present embodiment, the first cleaning units 73A and 73B and the second cleaning units 74A and 74B are roll sponge type cleaners. The roll sponge type cleaners are configured to bring two roll sponges into contact with an upper surface and a lower surface of the substrate while rotating the substrate and rotating the two roll sponges disposed above and below the substrate. In the present embodiment, the first cleaning units 73A and 73B and the second cleaning units 74A and 74B have the same structure.

In an embodiment, the first cleaning units 73A and 73B or the second cleaning units 74A and 74B may be pen sponge type cleaners. The pen sponge type cleaners are configured to bring pen type sponges into contact with the upper surface of the substrate and move the pen type sponges in a radial direction of the substrate while rotating the substrate and rotating the pen type sponges. A cleaning liquid is supplied onto the upper surface of the substrate during the cleaning of the substrate.

The drying units 75A and 75B are IPA type driers that dry the substrate by supplying pure water and IPA steam (a mixture of isopropyl alcohol and N2 gas) onto the upper surface of the substrate from a pure water nozzle and an IPA nozzle while moving the pure water nozzle and the IPA nozzle in a radial direction of the substrate. The drying units 75A and 75B may be other types of driers. For example, it is also possible to use a spin dry type dryer that rotates the substrate at a high speed.

In the present embodiment, the two first cleaning units 73A and 73B, the two second cleaning units 74A and 74B, and the two drying units 75A and 75B are provided. However, the disclosure is not limited to this embodiment, and the number of each of first cleaning units, second cleaning units, and drying units may be three or more. That is, three or more cleaning lanes may be provided. In an embodiment, the number of cleaning lanes may be one. In addition, a plurality of third cleaning units may be further provided between the second cleaning units 74A and 74B and the drying units 75A and 75B.

Next, an example of the operation of the substrate processing device will be described with reference to FIG. 1. The transport robot 22 takes the substrate out of the substrate cassettes and transfers the substrate to the lifter 11. The first linear transporter 6 takes the substrate out of the lifter 11 and the substrate is transported to at least one of the polishing parts 3A to 3D through the first linear transporter 6 and/or the second linear transporter 7. The substrate is polished by at least one of the polishing parts 3A to 3D.

The polished substrate is transported to the first cleaning unit 73A and the second cleaning unit 74A through the first linear transporter 6 or the second linear transporter 7, the swing transporter 12, and the first transport robot 77, and the polished substrate is cleaned sequentially by the first cleaning unit 73A and the second cleaning unit 74A. Further, the cleaned substrate is transported to the drying unit 75A by the transport robot 78, and the cleaned substrate is dried here. As described above, the substrate may also be transported to the first cleaning unit 73B, the second cleaning unit 74B, and the drying unit 75B.

The dried substrate is taken out of the drying unit 75A by the transport robot 22 and is returned to the substrate cassettes on the front loading parts 20. In this manner, a series of processes including polishing, cleaning, and drying is performed on the substrate.

Figure 3:
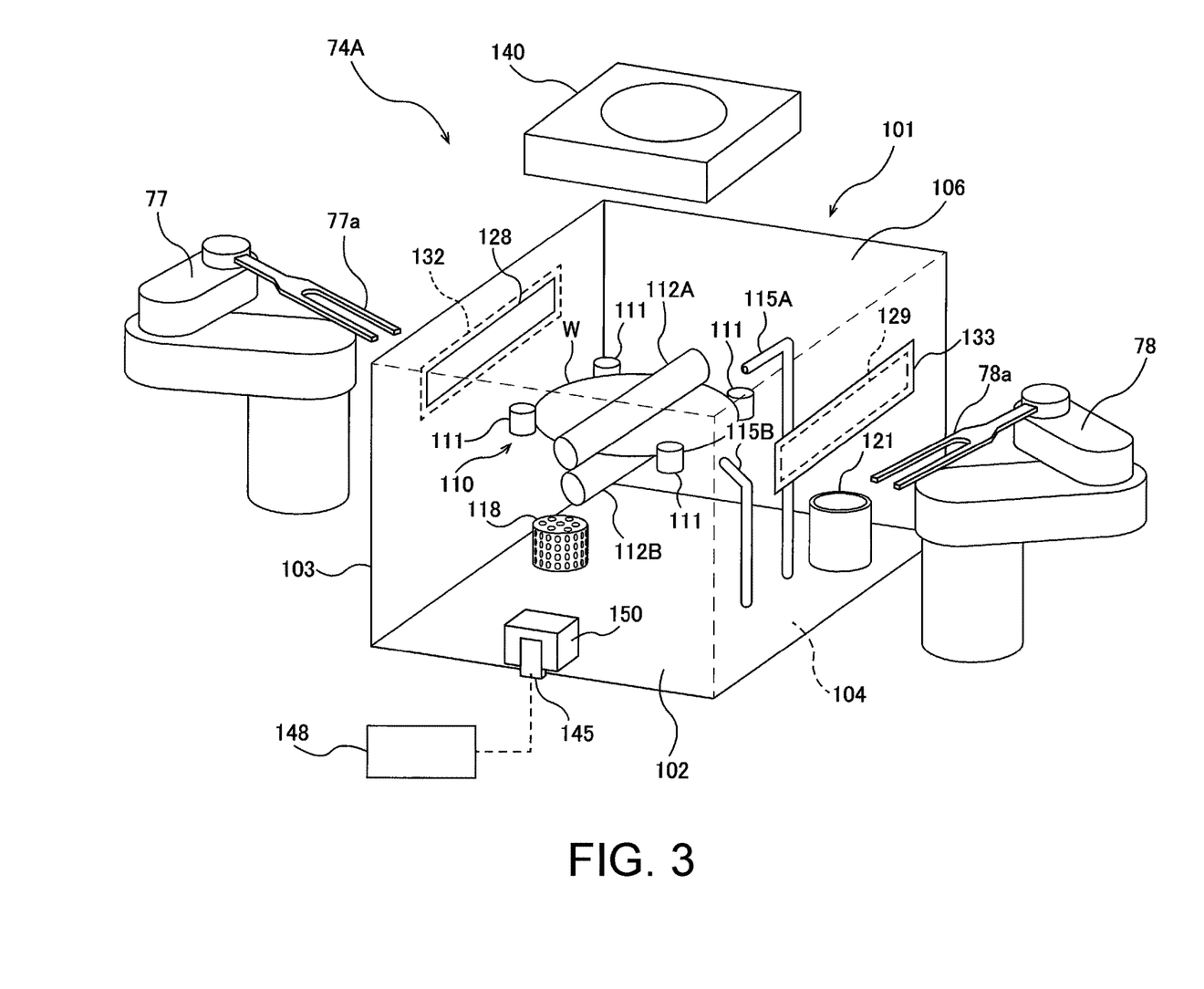
FIG. 3 is a schematic view showing an embodiment of a wet processing device.

The first cleaning units 73A and 73B and the second cleaning units 74A and 74B are wet processing devices. FIG. 3 is a schematic view showing an embodiment of the second cleaning unit 74A as a wet processing device. The second cleaning unit 74A shown in FIG. 3 is an embodiment of a substrate cleaning device for cleaning a substrate W such as a wafer. The second cleaning unit 74A includes a processing tank 101, a substrate holding part 110 disposed inside the processing tank 101, and roll sponges 112A and 112B as cleaning tools for cleaning a front surface of the substrate W held by the substrate holding part 110. The substrate holding part 110 includes holding rollers 111 that hold a peripheral edge of the substrate W. Each of the holding rollers 111 is configured to be rotatable around shaft centers thereof. Each of the holding rollers 111 rotates around the shaft centers thereof while the holding rollers 111 hold the peripheral edge of the substrate W, thereby rotating the substrate W.

The roll sponges 112A and 112B are disposed on the upper side and lower side of the substrate W. Shaft centers of the roll sponges 112A and 112B extend horizontally, and the roll sponges 112A and 112B are configured to be rotatable around the shaft centers thereof. Further, the roll sponges 112A and 112B are configured to be capable of moving in directions toward and away from the upper surface and the lower surface of the substrate W.

Two liquid supply nozzles 115A and 115B are disposed in proximity to the roll sponges 112A and 112B. The liquid supply nozzles 115A and 115B are disposed inside the processing tank 101. The liquid supply nozzle 115A faces the upper surface of the substrate W held by the substrate holding part 110, and the liquid supply nozzle 115B faces the lower surface of the substrate W held by the substrate holding part 110. The liquid supply nozzles 115A and 115B are configured to supply a liquid to the upper surface and the lower surface of the substrate W. The liquid is a processing liquid such as a chemical liquid or pure water and/or a rinse liquid such as pure water. Four or more liquid supply nozzles for separately supplying a chemical liquid and a rinse liquid may be provided. The type of liquid used for the processing of the substrate W is not limited to the present embodiment and is appropriately selected on the basis of the purpose of substrate processing.

The substrate W is cleaned as follows. The holding rollers 111 rotate the substrate W by rotating around the shaft centers thereof while holding the peripheral edge of the substrate W. The rotating roll sponges 112A and 112B come into contact with the upper surface and the lower surface of the substrate W while the liquid supply nozzles 115A and 115B supply a processing liquid such as a chemical liquid or pure water to the upper surface and the lower surface of the rotating substrate W. The roll sponges 112A and 112B scrub the upper surface and the lower surface of the substrate W under the presence of the processing liquid. When a predetermined period of time elapses, the roll sponges 112A and 112B are separated from the substrate W. Subsequently, the liquid supply nozzles 115A and 115B supply a rinse liquid such as pure water to the upper surface and the lower surface of the rotating substrate W and rinse the upper surface and the lower surface of the substrate W. The processing (cleaning) of the substrate W is performed in this manner.

A drain port 118 is disposed at a bottom 102 of the processing tank 101. The liquid such as a processing liquid and a rinse liquid used for the cleaning (processing) of the substrate W is discharged from the processing tank 101 through the drain port 118. The bottom 102 of the processing tank 101 is slightly inclined toward the drain port 118, and the liquid flows toward the drain port 118. The drain port 118 protrudes upward from the bottom 102 of the processing tank 101. A large number of holes are formed in the entire drain port 118, and the drain port 118 itself also functions as a strainer. That is, the liquid flows into the drain port 118 through the holes of the drain port 118. In the present embodiment, the drain port 118 has a cylindrical shape, but it may have other shapes. In an embodiment, the drain port 118 may be provided at a lower end of a side wall 103, a side wall 104, or a back wall 106 of the processing tank 101.

An exhaust port 121 is further disposed at the bottom 102 of the processing tank 101. The exhaust port 121 is connected to a vacuum pump not shown in the drawing. The exhaust port 121 exhausts air from an inner space of the processing tank 101 at all times, and thus negative pressure is formed inside the processing tank 101. The exhaust port 121 protrudes upward from the bottom 102 of the processing tank 101 so that a liquid on the bottom 102 of the processing tank 101 does not enter the exhaust port 121. In the present embodiment, the exhaust port 121 is provided at the bottom 102 of the processing tank 101. However, in an embodiment, the exhaust port 121 may be provided on the side wall 103, the side wall 104, or the back wall 106 of the processing tank 101.

The first transport robot 77 for carrying the substrate W into the processing tank 101 and the second transport robot 78 for carrying the substrate W out of the processing tank 101 are disposed on both sides of the processing tank 101. A substrate inlet 128 and a substrate outlet 129 are respectively formed in the two side walls 103 and 104 of the processing tank 101. The substrate inlet 128 and the substrate outlet 129 are respectively covered with an inlet shutter 132 and an outlet shutter 133. The shutters 132 and 133 are opened and closed by an actuator not shown in the drawing.

The substrate inlet 128 and the substrate outlet 129 also function as air intake ports. When the inlet shutter 132 and the outlet shutter 133 are closed, the processing tank 101 is not completely sealed. That is, even when the inlet shutter 132 and the outlet shutter 133 are closed, air flows into the processing tank 101 from a small gap between the inlet shutter 132 and the substrate inlet 128 and a small gap between the outlet shutter 133 and the substrate outlet 129, thereby forming a flow of air inside the processing tank 101. When any one of the inlet shutter 132 and the outlet shutter 133 is opened, a large amount of air flows into the processing tank 101 through the substrate inlet 128 or the substrate outlet 129 and is discharged from the processing tank 101 through the exhaust port 121. In this case, a strong flow of air is formed inside the processing tank 101.

A clean air supply device 140 is disposed above the processing tank 101. The clean air supply device 140 is a fan filter unit including a HEPA filter or a ULPA filter and a fan. The clean air supply device 140 removes dust and particles from the surrounding air and forms a flow of purified air. The clean air supply device 140 is disposed at a position higher than the substrate inlet 128 and the substrate outlet 129 of the processing tank 101. Air cleaned by the clean air supply device 140 flows into the processing tank 101 through a small gap between the above-described substrate inlet 128 and substrate outlet 129 or between the inlet shutter 132 and the substrate inlet 128 and a small gap between the outlet shutter 133 and the substrate outlet 129 and flows toward the exhaust port 121. The processing tank 101 is disposed under a clean air environment, and thus the substrate W processed in the processing tank 101 is prevented from being contaminated. In addition, a location where the clean air supply device 140 is installed is above the processing tank 101. However, instead of this, the clean air supply device 140 may be installed at two locations in an uppermost part (for example, a ceiling part of the cleaning part 4) in a space where each of the first transport robot 77 and the second transport robot 78 moves in a vertical direction.

As described above, the drain port 118 also functions as a strainer. For this reason, the drain port 118 may be clogged due to fragments of the substrate or foreign substances. When the drain port 118 is clogged, a liquid such as a chemical liquid or pure water which is used for the processing of the substrate W cannot be discharged from the processing tank 101. As a result, a liquid level inside the processing tank 101 rises, and the degree of cleanness inside the processing tank 101 may be reduced.

Consequently, an optical liquid level detection sensor 145 for detecting a liquid level inside the processing tank 101 is provided at the bottom 102 of the processing tank 101. The optical liquid level detection sensor 145 is disposed to face the inside of the processing tank 101. Further, a sensor target cover 150 facing the optical liquid level detection sensor 145 is provided at the bottom 102 of the processing tank 101. The optical liquid level detection sensor 145 is electrically connected to the signal processing part 148, so that a signal output from the optical liquid level detection sensor 145 is transmitted to the signal processing part 148.

Figure 4:
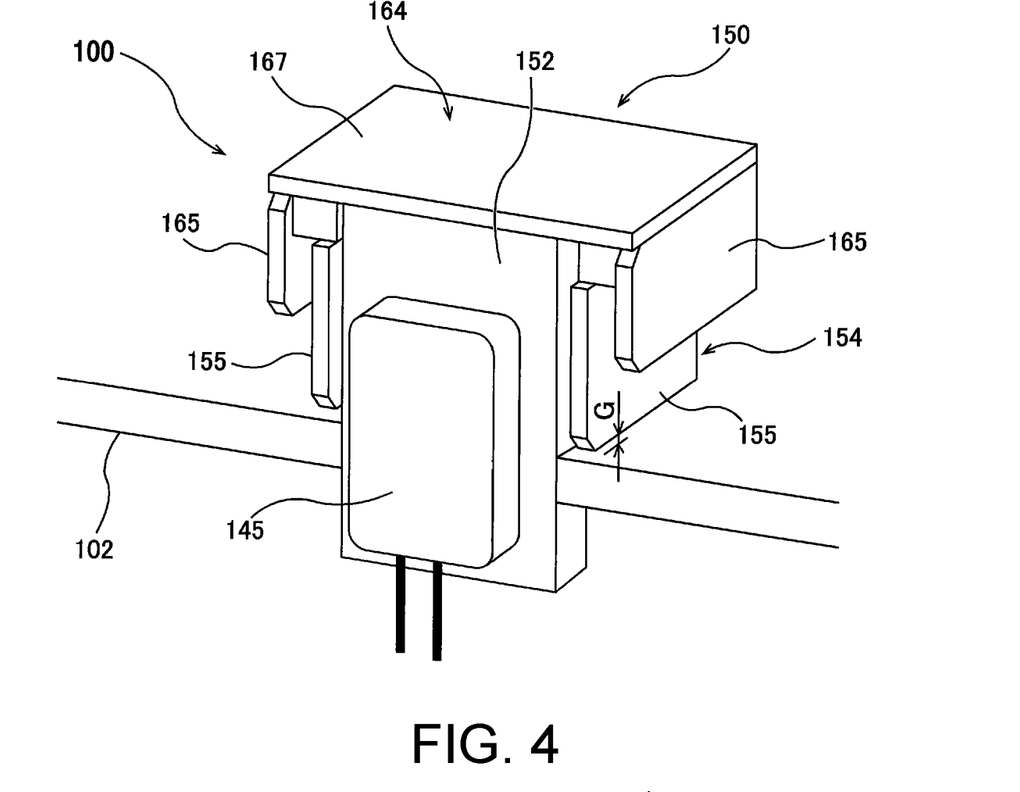
FIG. 4 is a perspective view showing an optical liquid level detection sensor and a sensor target cover.

FIG. 4 is a perspective view showing the optical liquid level detection sensor 145 and the sensor target cover 150. A sensor assembly 100 for use in wet processing device comprises the optical liquid level detection sensor 145 for detecting a liquid level inside the processing tank 101 and the sensor target cover 150 facing the optical liquid level detection sensor 145. Both the optical liquid level detection sensor 145 and the sensor target cover 150 are fixed to a supporting member 152. The supporting member 152 is fixed to the bottom 102 of the processing tank 101 and protrudes upward from the bottom 102 of the processing tank 101. The optical liquid level detection sensor 145 is fixed to an external surface of the supporting member 152, and the sensor target cover 150 is fixed to a top surface of the supporting member 152. A gap G is formed between a lower end of the sensor target cover 150 and the bottom 102 of the processing tank 101. When a liquid level inside the processing tank 101 rises, a liquid enters the sensor target cover 150 from the gap G.

The sensor target cover 150 includes an inner wall structure 154 and an outer wall structure 164 surrounding the inner wall structure 154. The inner wall structure 154 includes two inner walls 155, and the outer wall structure 164 includes two outer walls 165 respectively disposed on the outer sides of the two inner walls 155 and a ceiling wall 167 connected to the two outer walls 165. The inner wall structure 154 does not have a ceiling wall. A lower end of the outer wall structure 164 is positioned higher than a lower end of the inner wall structure 154, and an upper end of the outer wall structure 164 is positioned higher than an upper end of the inner wall structure 154. The width of the outer wall structure 164 is larger than the width of the inner wall structure 154.

Figure 5:
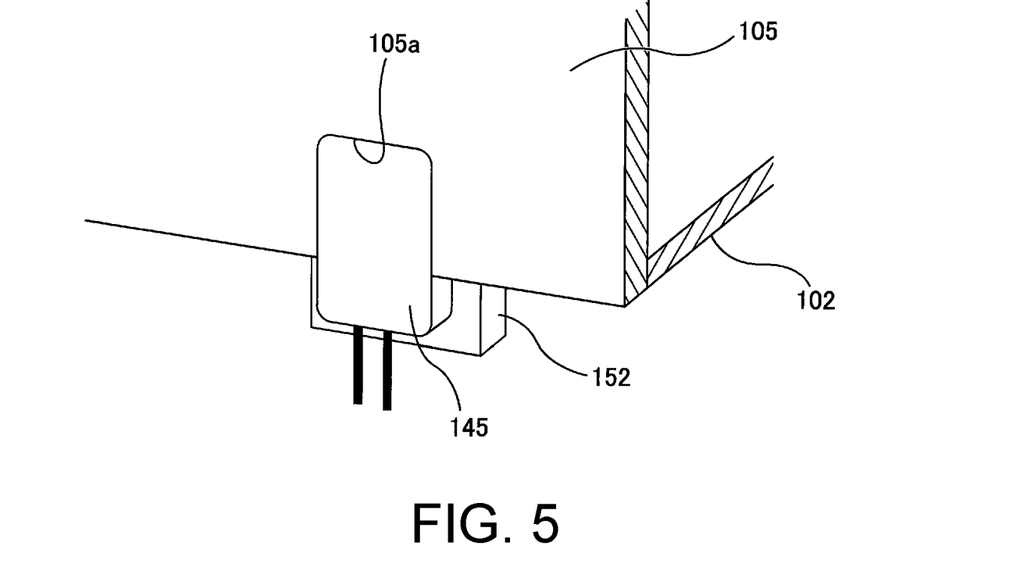
FIG. 5 is a perspective view showing a state where a front wall of a processing tank is fixed to a bottom of the processing tank.

FIG. 5 is a perspective view showing a state where a front wall 105 of the processing tank 101 is fixed to the bottom 102. FIG. 4 described above shows a state where the front wall 105 of the processing tank 101 is removed. As shown in FIG. 5, a notch 105a having a shape along the external shape of the optical liquid level detection sensor 145 is formed in the front wall 105. In a state where the optical liquid level detection sensor 145 is positioned inside the notch 105a, the front wall 105 is fixed to the bottom 102. The front wall 105 is in contact with the outer surface of the supporting member 152 and the bottom 102 without a gap, so that a liquid inside the processing tank 101 does not leak to the outside through the notch 105a.

Figure 6:
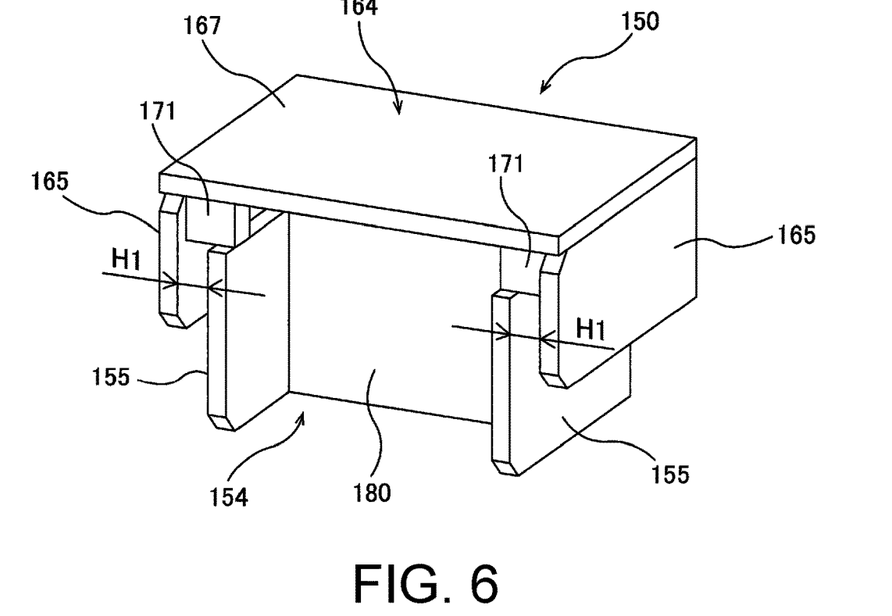
FIG. 6 is a perspective view of the sensor target cover shown in FIG. 4.
Figure 7:
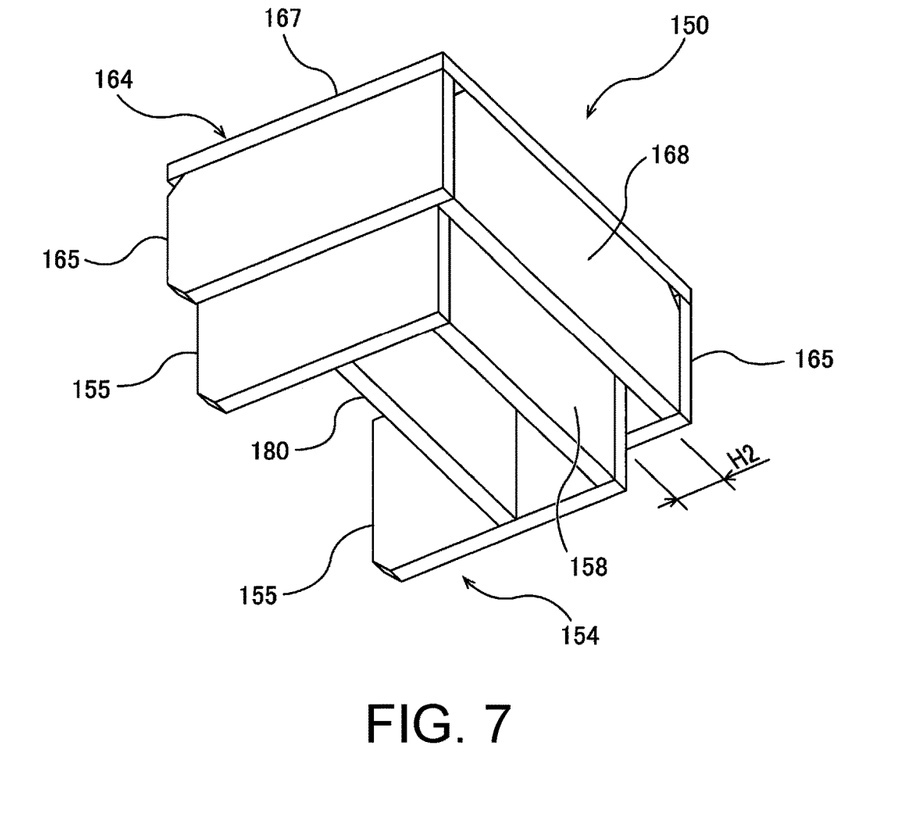
FIG. 7 is a perspective view of the sensor target cover from below.
Figure 8:
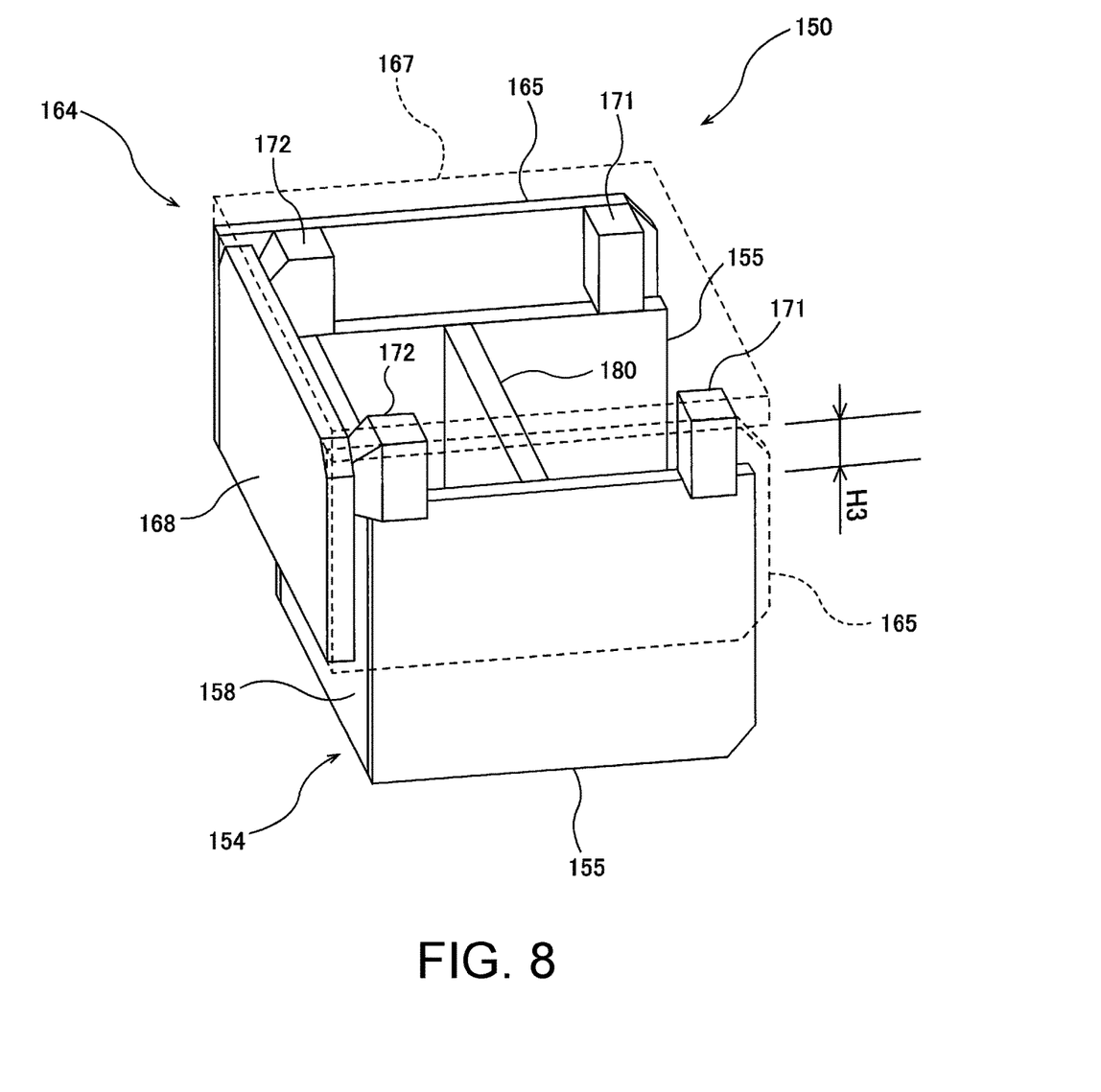
FIG. 8 is a perspective view showing a portion of the sensor target cover which is indicated by a dashed line.

FIG. 6 is a perspective view of the sensor target cover 150 shown in FIG. 4, FIG. 7 is a perspective view when the sensor target cover 150 is seen from below, and FIG. 8 is a perspective view showing a portion of the sensor target cover 150 by a dashed line. The sensor target cover 150 includes a reflecting plate 180 as a sensor target. The reflecting plate 180 is surrounded by the inner wall structure 154. The inner wall structure 154 includes an inner protection wall 158 facing the reflecting plate 180 and two inner walls 155 respectively disposed on both sides of the reflecting plate 180 and the inner protection wall 158. The inner protection wall 158 is disposed between two inner walls 155, and both ends of the inner protection wall 158 are respectively connected to the two inner walls 155.

The inner wall structure 154 is surrounded by the outer wall structure 164. The outer wall structure 164 includes the two outer walls 165 respectively disposed on the outer sides of the two inner walls 155, an outer protection wall 168 disposed on the outer sides of the inner protection wall 158, and the ceiling wall 167. The outer protection wall 168 is disposed between the two outer walls 165, and both ends of the outer protection wall 168 are respectively connected to the two outer walls 165. The two outer walls 165 and the outer protection wall 168 are fixed to the ceiling wall 167. The two outer walls 165 and the outer protection wall 168 extend downward from the ceiling wall 167. The inner protection wall 158 is disposed between the reflecting plate 180 and the outer protection wall 168. The inner protection wall 158 and the outer protection wall 168 constitute a double protection wall for preventing a liquid from adhering to the reflecting plate 180.

Spacers 171 and 172 are disposed between the inner wall structure 154 and the outer wall structure 164. More specifically, two first spacers 171 are respectively fixed to sides of upper portions of the two inner walls 155. Further, two second spacers 172 are respectively fixed to other sides of the upper portions of the two inner walls 155. The first spacers 171 and the second spacers 172 protrude outward from the two inner walls 155 and protrude upward from upper ends of the two inner walls 155. Each of the outer walls 165 is connected to the first spacers 171 and the second spacers 172, and the outer protection wall 168 is connected to the two second spacers 172. A lower surface of the ceiling wall 167 is connected to the two first spacers 171 and the two second spacers 172. The lower surface of the ceiling wall 167 and the upper ends of the outer walls 165 are positioned higher than the upper ends of the inner walls 155 and the upper end of the inner protection wall 158.

The inner wall structure 154 and the outer wall structure 164 are connected to each other by the two first spacers 171 and the two second spacers 172, and a gap is formed between the inner wall structure 154 and the outer wall structure 164 by the two first spacers 171 and the two second spacers 172. More specifically, a gap H1 is formed between the outer surface of the inner wall 155 and the inner surface of the outer wall 165, a gap H2 is formed between the outer surface of the inner protection wall 158 and the inner surface of the outer protection wall 168, and a gap H3 is formed between an upper end of each of the inner wall 155 and the inner protection wall 158 and a lower surface of the ceiling wall 167. An inner space of the inner wall structure 154 is connected to an outer space thereof through the gaps H1, H2, and H3.

In the present embodiment, the reflecting plate 180, the inner wall structure 154, the outer wall structure 164, the first spacer 171, and the second spacer 172 are formed of a transparent resin such as acrylic resin.

Figure 9:
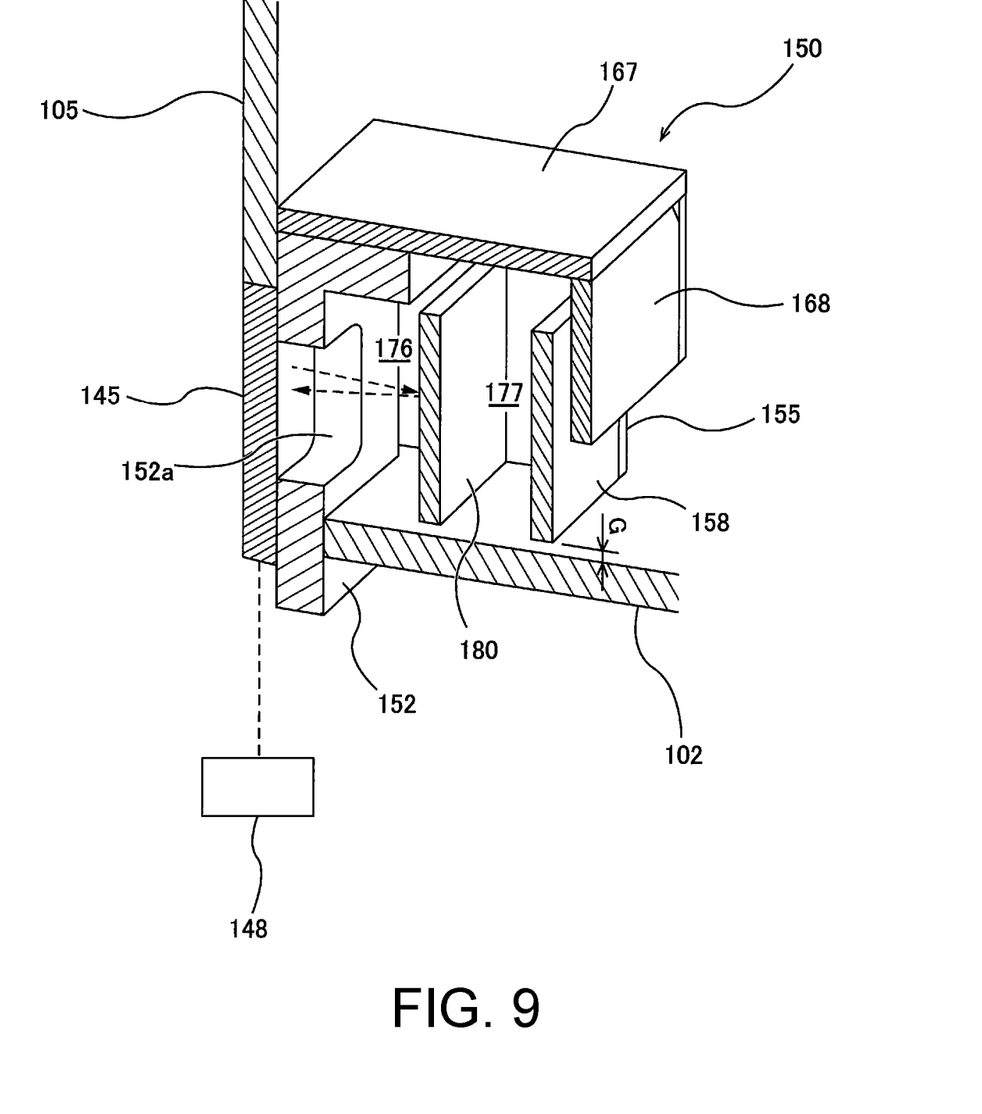
FIG. 9 is a cross-sectional perspective view showing the optical liquid level detection sensor and the sensor target cover which are fixed to a supporting member.

FIG. 9 is a cross-sectional perspective view showing the optical liquid level detection sensor 145 and the sensor target cover 150 which are fixed to the supporting member 152. As shown in FIG. 9, the ceiling wall 167 is fixed to the supporting member 152. In the present embodiment, only the ceiling wall 167 of the sensor target cover 150 is in contact with the supporting member 152, and the entire sensor target cover 150 is supported by the supporting member 152. As described above, the lower end of the sensor target cover 150 (that is, the lower ends of the two inner walls 155 and the inner protection wall 158) are separated from the bottom 102 of the processing tank 101 through the gap G.

The optical liquid level detection sensor 145 includes a light source emitting light (for example, a light emitting diode (LED)) and a light detector. The supporting member 152 has a through hole 152a, and the optical liquid level detection sensor 145 is fixed to the supporting member 152 so as to cover the through hole 152a. One surface of the reflecting plate 180 faces the optical liquid level detection sensor 145, and the other surface of the reflecting plate 180 faces the inner protection wall 158. The inner space of the inner wall structure 154 is partitioned into a first room 176 and a second room 177 by the reflecting plate 180. The first room 176 is surrounded by the two inner walls 155 and the reflecting plate 180, and the second room 177 is surrounded by the reflecting plate 180, the two inner walls 155, and the inner protection wall 158. The through hole 152a of the supporting member 152 is positioned inside the first room 176.

The reflecting plate 180 is disposed between the optical liquid level detection sensor 145 and the inner protection wall 158. The optical liquid level detection sensor 145 is configured to guide light to the reflecting plate 180 through the through hole 152a and measure the amount of light reflected from the reflecting plate 180. The optical liquid level detection sensor 145 transmits a measured value of the amount of light to the signal processing part 148. The signal processing part 148 is configured to detect a rise in a liquid level inside the processing tank 101 on the basis of the measured value of the amount of light.

When a liquid inside the processing tank 101 is normally discharged through the drain port 118, that is, when a liquid level inside the processing tank 101 does not rise, the optical liquid level detection sensor 145 can receive light reflected from the reflecting plate 180. When a liquid level inside the processing tank 101 rises, the liquid enters the sensor target cover 150 through the gap G, and the reflecting plate 180 is immersed in the liquid. Since air and a liquid have different refractive indexes, the optical liquid level detection sensor 145 cannot receive light reflected from the reflecting plate 180. As a result, the amount of light measured by the optical liquid level detection sensor 145 is reduced. The signal processing part 148 receives the measured value of the amount of light from the optical liquid level detection sensor 145, compares the measured value of the amount of light with a threshold value which is set in advance, and determines a rise in a liquid level inside the processing tank 101 when the measured value of the amount of light is smaller than the threshold value.

When a liquid adheres to the reflecting plate 180 or condensation occurs in the reflecting plate 180, the amount of light measured by the optical liquid level detection sensor 145 is reduced although a liquid level inside the processing tank 101 has not risen. As a result, the signal processing part 148 erroneously detects a rise in a liquid level. In particular, as in the present embodiment, when the substrate W is processed while supplying a liquid to the rotating substrate W, the liquid scatters from the substrate W and easily adheres to the reflecting plate 180.

According to the present embodiment, the reflecting plate 180 is surrounded by the inner wall structure 154, and the inner wall structure 154 is surrounded by the outer wall structure 164. Therefore, the inner wall structure 154 and the outer wall structure 164 can prevent a liquid from adhering to the reflecting plate 180. Further, since a gap is formed between the inner wall structure 154 and the outer wall structure 164, a flow of air is formed inside the sensor target cover 150. Such a flow of air can prevent condensation from occurring in the reflecting plate 180 inside the sensor target cover 150. In general, the inside of the processing tank 101 is in a hot and humid state due to the presence of a heat source such as a motor and a liquid used for the processing the substrate W. Since the above-described sensor target cover 150 has a high air permeability even under a hot and humid environment, it is possible to prevent condensation from occurring in the reflecting plate 180 disposed inside the sensor target cover 150. Therefore, the optical liquid level detection sensor 145 can accurately detect a liquid level inside the processing tank 101.

Figure 10:
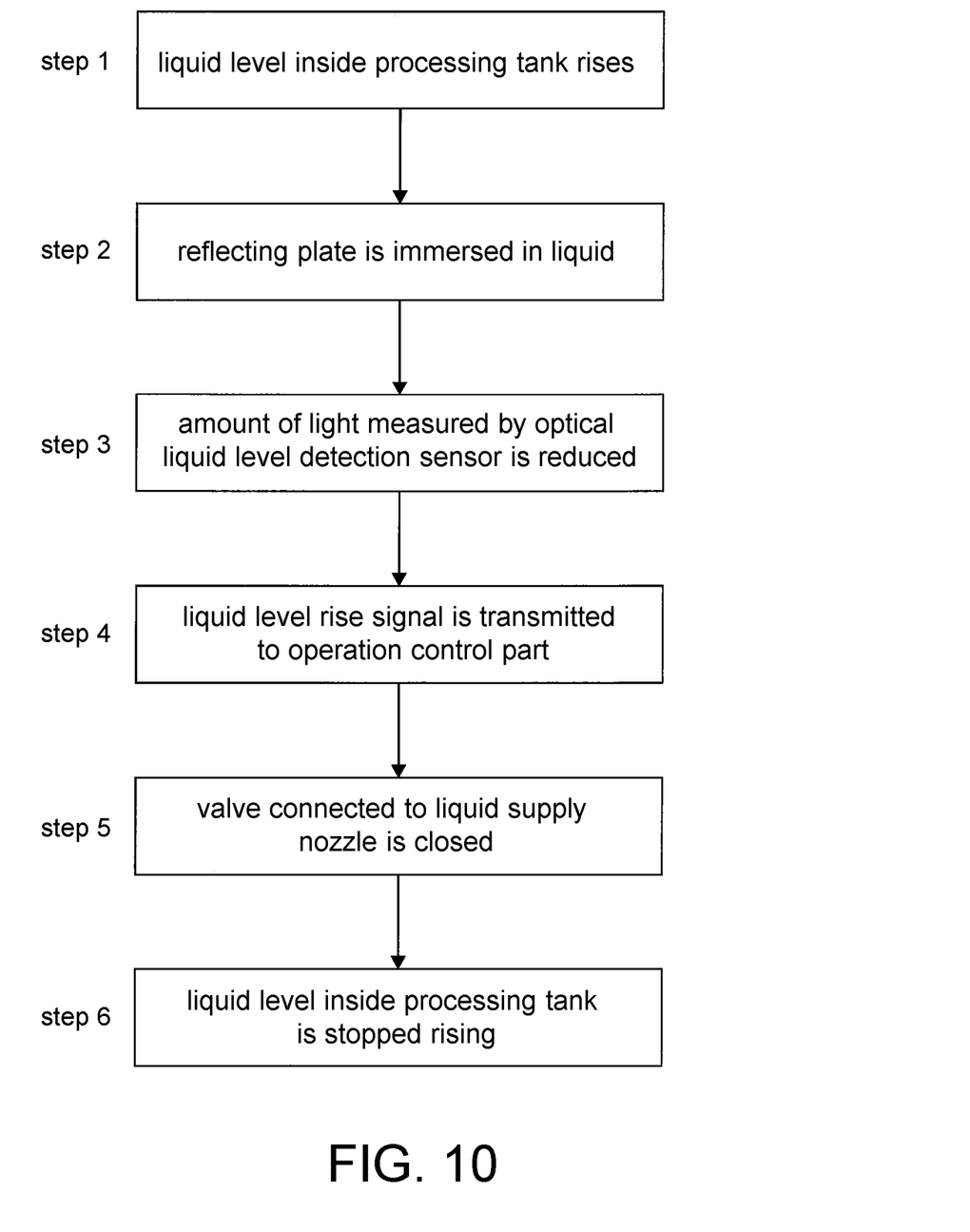
FIG. 10 is a flowchart showing an operation when a liquid level inside the processing tank rises.

FIG. 10 is a flowchart showing an operation when a liquid level inside the processing tank 101 rises. When a liquid level inside the processing tank 101 rises for any reason (step 1), a liquid enters the sensor target cover 150. When the reflecting plate (sensor target) 180 is immersed in the liquid (step 2), the amount of light measured by the optical liquid level detection sensor 145 is reduced (step 3). When a measured value of the amount of light is smaller than a threshold value which is set in advance, the signal processing part 148 transmits a liquid level rise signal to the operation control part 5 shown in FIG. 1 (step 4). When the operation control part 5 receives the liquid level rise signal, the operation control part 5 closes a valve (not shown) connected to the liquid supply nozzles 115A and 115B (step 5). Thereby, the liquid level inside the processing tank 101 is stopped rising (step 6).

Next, an embodiment of an operation of the second cleaning unit 74A which is an example of the wet processing device shown in FIG. 3 will be described. The inlet shutter 132 is opened in a state where air inside the processing tank 101 is exhausted from the exhaust port 121. The outlet shutter 133 remains closed. When the inlet shutter 132 is opened, a large amount of clean air supplied from the clean air supply device (fan filter unit) 140 flows into the processing tank 101 from the substrate inlet 128, and a strong flow of air is formed inside the processing tank 101. In this case, a flow of air is also formed inside the sensor target cover 150. Further, temperature inside the processing tank 101 is reduced due to clean air flowing into the processing tank 101.

The first transport robot 77 carries the substrate W to be processed into the processing tank 101 from the substrate inlet 128, the substrate W being mounted on a hand 77a of the first transport robot 77. When the holding rollers 111 of the substrate holding part 110 receive the substrate W, the hand 77a of the first transport robot 77 moves outside the processing tank 101. Subsequently, the inlet shutter 132 is closed. The holding rollers 111 rotate the substrate W by rotating around the shaft centers thereof while holding the peripheral edge of the substrate W. While the liquid supply nozzles 115A and 115B supply a processing liquid such as a chemical liquid or pure water to the upper surface and the lower surface of the rotating substrate W, the rotating roll sponges 112A and 112B come into contact with the upper surface and the lower surface of the substrate W. The roll sponges 112A and 112B scrub the upper surface and the lower surface of the substrate W under the presence of the processing liquid. When a predetermined period of time elapses, the roll sponges 112A and 112B are separated from the substrate W. Subsequently, the liquid supply nozzles 115A and 115B supply a rinse liquid such as pure water to the upper surface and the lower surface of the rotating substrate W to rinse the upper surface and the lower surface of the substrate W. In this manner, the processing (cleaning) of the substrate W is performed.

After the processing of the substrate W is terminated, the outlet shutter 133 is opened. A large amount of clean air supplied from the clean air supply device (fan filter unit) 140 flows into the processing tank 101 from the substrate outlet 129, and a strong flow of air is formed inside the processing tank 101. In this case, a flow of air is also formed inside the sensor target cover 150. Further, temperature inside the processing tank 101 is reduced due to clean air flowing into the processing tank 101. The second transport robot 78 takes out the substrate W from the holding rollers 111 using a hand 78a and carries out the substrate W from the processing tank 101. In addition, the outlet shutter 133 is closed.

Air inside the processing tank 101 is continuously exhausted from the exhaust port 121 before, during, and after the processing of the substrate W. Even when the inlet shutter 132 and the outlet shutter 133 are closed, air flows into the processing tank 101 from a small gap between the inlet shutter 132 and the substrate inlet 128 and a small gap between the outlet shutter 133 and the substrate outlet 129, thereby forming a flow of air inside the processing tank 101. Therefore, a flow of air is formed inside the processing tank 101 as long as air inside the processing tank 101 is continuously exhausted from the exhaust port 121. Such a flow of air is also formed inside the sensor target cover 150.

Figure 11:
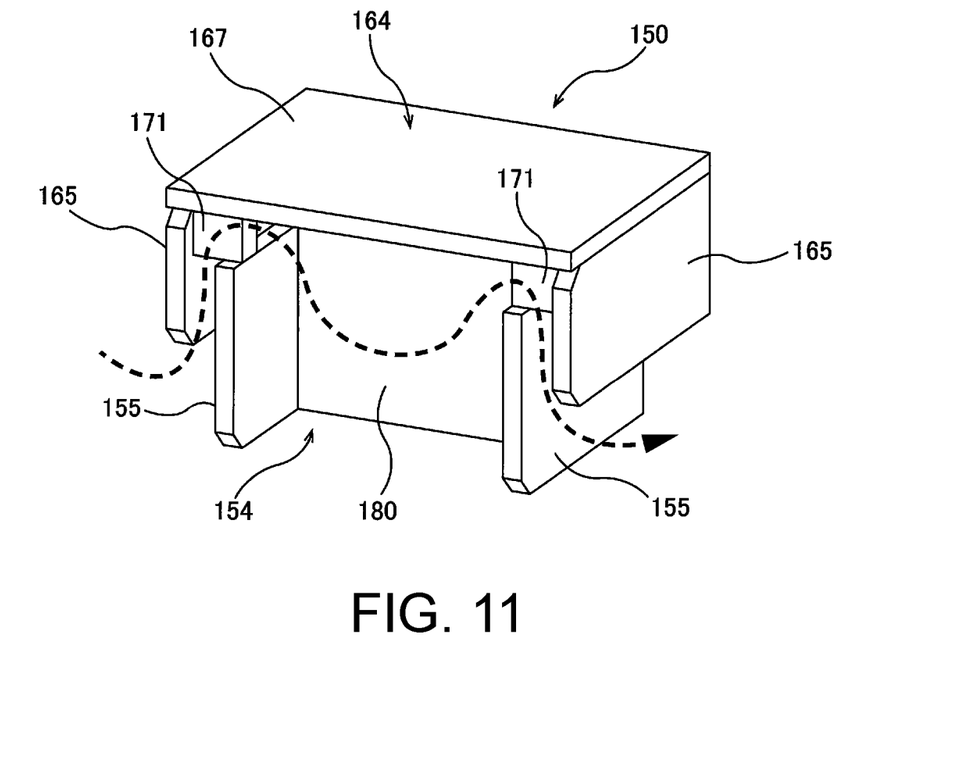
FIG. 11 is a diagram showing a flow of air formed inside the sensor target cover.

FIG. 11 is a diagram showing a flow of air formed inside the sensor target cover 150. As shown in FIG. 11, air passes through both the first room 176 and the second room 177 (see FIG. 9) of the sensor target through a gap between the inner wall structure 154 and the outer wall structure 164 of the sensor target cover 150. Such a flow of air can prevent condensation from occurring in the reflecting plate 180.

The inventor performed an experiment for observing a state where condensation of the reflecting plate 180 was removed. In the experiment, the sensor target cover 150 according to the above-described embodiment and a sealed sensor target cover having no gap were used. The experiment was performed while exhausting air inside the processing tank 101 from the exhaust port 121 under an ambient temperature of 23.5° C. The experiment was started in a state where condensation was intentionally made to occur in reflecting plates of the two sensor target covers. The condensation occurring in the reflecting plate of the sensor target cover having no gap was not eliminated even when two hours elapsed from the start of the experiment, but the condensation occurring in the reflecting plate 180 of the sensor target cover 150 according to the present embodiment was almost eliminated 30 minutes after the start of the experiment. From results of the experiment, it can be understood that the gap between the inner wall structure 154 and the outer wall structure 164 greatly contributes to the elimination of condensation occurring in the reflecting plate 180.

Examples of the wet processing device including the sensor target cover 150 and the optical liquid level detection sensor 145 according to the above-described present embodiment include a device that processes a rotating substrate using a cleaning tool or a processing tool smaller than the substrate, such as a substrate cleaning device including a pen sponge and a buff polishing device that finish-polishes the substrate while supplying slurry to the rotating substrate, or a peripheral edge processing device that polishes or grinds a peripheral edge of the substrate, in addition to the substrate cleaning device including the roll sponges 112A and 112B shown in FIG. 3.

In an embodiment, two outer walls 165 of the outer wall structure 164 may be omitted, and the gaps H1 and H3 shown in FIGS. 6 and 8 may be eliminated. In this case, air flows into the sensor target cover 150 from the gap H2 shown in FIG. 7. Further, in an embodiment, the outer protection wall 168 of the outer wall structure 164 may be omitted, and the gap H2 shown in FIG. 7 may be eliminated. In this case, air flows into the sensor target cover 150 from the gaps H1 and H3 shown in FIGS. 6 and 8.

The above-described embodiment is described in order for one skilled in the art to be able to implement the disclosure. Various modification examples of the above-described embodiment may be naturally implemented by one ordinary skilled in the art, and the technical idea of the disclosure can also be applied to other embodiments. Therefore, the disclosure is not limited to the described embodiment and is construed in the broadest scope in accordance with the technical idea defined by the scope of claims.

What is claimed is:

1. A sensor target cover used in combination with an optical liquid level detection sensor, the sensor target cover comprising:
   a reflecting plate;
   an inner wall structure surrounding the reflecting plate; and
   an outer wall structure surrounding the inner wall structure,
   wherein a gap is formed between the inner wall structure and the outer wall structure,
   wherein the inner wall structure includes an inner protection wall facing the reflecting plate and two inner walls disposed on both sides of the reflecting plate and the inner protection wall,
   wherein the outer wall structure includes two outer walls respectively disposed on the outer sides of the two inner walls, an outer protection wall disposed on the outer side of the inner protection wall, and a ceiling wall,
   wherein gaps are respectively formed between outer surfaces of the two inner walls and inner surfaces of the two outer walls, a gap is formed between an outer surface of the inner protection wall and an inner surface of the outer protection wall, and a gap is formed between an upper end of each of the two inner walls and the inner protection wall and a lower surface of the ceiling wall.

2. The sensor target cover according to claim 1, wherein a lower end of the outer wall structure is positioned higher than a lower end of the inner wall structure, and an upper end of the outer wall structure is positioned higher than an upper end of the inner wall structure.

3. The sensor target cover according to claim 1, wherein an inner space of the inner wall structure is partitioned into a first room and a second room by the reflecting plate.

4. A wet processing device comprising:
   a processing tank;
   a substrate holding part disposed inside the processing tank;
   a drain port disposed at the processing tank;
   a liquid supply nozzle disposed inside the processing tank;
   an optical liquid level detection sensor detecting a liquid level inside the processing tank; and
   a sensor target cover facing the optical liquid level detection sensor,
   wherein the sensor target cover is the sensor target cover according to claim 1.

5. The wet processing device according to claim 4, wherein a gap is formed between a lower end of the sensor target cover and a bottom of the processing tank.

6. The wet processing device according to claim 4, further comprising:
   an exhaust port disposed inside the processing tank.

7. The wet processing device according to claim 4, further comprising:
   a clean air supply device disposed at a position higher than a substrate inlet and a substrate outlet of the processing tank.

8. A substrate processing device comprising:
   a polishing part polishing a substrate;
   a cleaning part including a plurality of wet processing devices that clean the substrate being polished; and
   a transport device transporting the substrate being polished from the polishing part to the cleaning part,
   wherein the wet processing device is the wet processing device according to claim 4.

9. A sensor assembly for use in wet processing device, comprising:
   an optical liquid level detection sensor; and
   a sensor target cover facing the optical liquid level detection sensor;
   wherein the sensor target cover comprising:
   a reflecting plate;
   an inner wall structure surrounding the reflecting plate; and
   an outer wall structure surrounding the inner wall structure,
   wherein a gap is formed between the inner wall structure and the outer wall structure,
   wherein the inner wall structure includes an inner protection wall facing the reflecting plate and two inner walls disposed on both sides of the reflecting plate and the inner protection wall,
   wherein the outer wall structure includes two outer walls respectively disposed on the outer sides of the two inner walls, an outer protection wall disposed on the outer side of the inner protection wall, and a ceiling wall,
   wherein gaps are respectively formed between outer surfaces of the two inner walls and inner surfaces of the two outer walls, a gap is formed between an outer surface of the inner protection wall and an inner surface of the outer protection wall, and a gap is formed between an upper end of each of the two inner walls and the inner protection wall and a lower surface of the ceiling wall.

10. A wet processing device comprising:
    a processing tank;
    a substrate holding part disposed inside the processing tank;
    a drain port disposed at the processing tank;
    a liquid supply nozzle disposed inside the processing tank;
    an optical liquid level detection sensor detecting a liquid level inside the processing tank; and
    a sensor target cover facing the optical liquid level detection sensor, the sensor target cover comprising:
    a reflecting plate;
    an inner wall structure surrounding the reflecting plate; and
    an outer wall structure surrounding the inner wall structure,
    wherein a gap is formed between the inner wall structure and the outer wall structure,
    wherein a gap is formed between a lower end of the sensor target cover and a bottom of the processing tank.

* * * * *